7163X
I. Gassner,
Cook Stove.
Patented July 11. 1832.
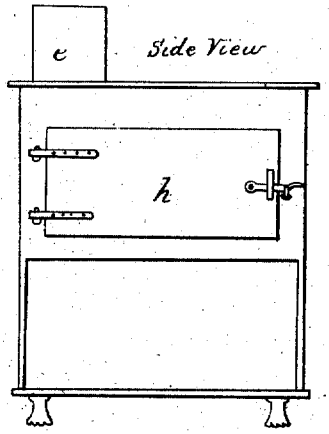
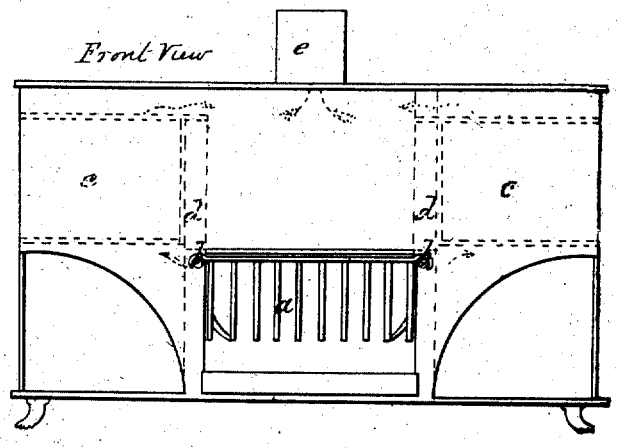
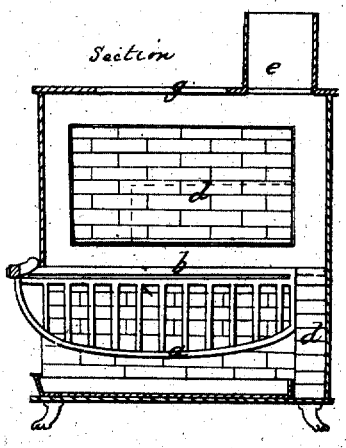
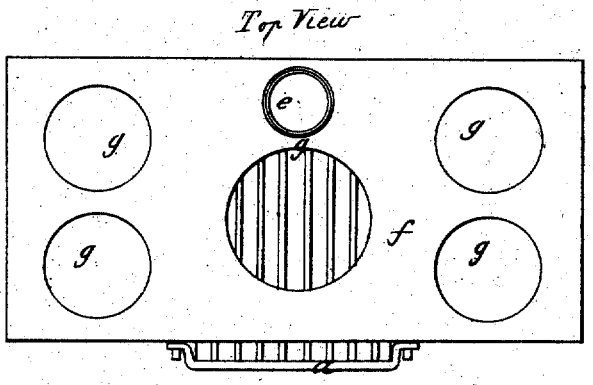

7163x July 11. 1832 [illegible]

David Gafsner of New York City

Letters Patent Dated July 11. 1832.

The Schedule referred to in these Letters Patent and making part of the same, containing a description in the words of the said David Gafsner himself of his improvement in the construction of Coal cooking Stoves.

To all to whom these presents shall come. Be it known that I David Gafsner of the City County and State of New York have invented a new and valuable improvement in Coal Cooking Stoves, and that the following is a full and exact description of the construction and operation of the said Improvement as invented by me. — The improved coal cooking Stove as here in claimed by the Subscriber is particularly adapted for burning Anthracite coal, and may be constructed of sheet or cast iron as follows.

The grate which is of a concave form is placed in the centre of the Stove, its bars extending horizontally and somewhat [illegible] from front to back, it is supported at each side by a horizontal moveable bar upon which it rests as a hinge or pivot. One or both of these bars may be withdrawn, when it is necessary to clean or repair the grate. There are two ovens attached to the Stove, one of which is placed at each side the grate and elevated sufficiently above it to admit the heat underneath. There are spaces for admitting the heat also at the sides of each oven, between the front and back plates of the Stove. The backs of the ovens are shielded with fire Brick & form a perpendicular line with the sides of the grate, thus leaving a space of the width of the grate between them, thro which the smoke and heat passes to the chimney above. The top or upper plate of the Stove is rais ed a suitable height above the ovens and is perforated to admit boiling.

The advantage obtained by this method of construction is a steady and uniform degree of heat which may be applied to all parts of the stove at the same time. — The subscriber claims the privilege of constructing his improved coal cooking Stove of any shape or dimensions Wm [illegible] Gafsner
Witnesses } [illegible] Gafsner David Gafsner
[illegible]

[illegible] [illegible] July 20. 1832 —